United States Patent [19]
Hargrave

[11] Patent Number: 5,461,438
[45] Date of Patent: Oct. 24, 1995

[54] UNDERWATER SINGLE-USE CAMERA WITH GUIDE TO DIRECT ONE'S FINGER OVER OBSTRUCTION DURING ROTATION OF THUMBWHEEL

[75] Inventor: Jerry L. Hargrave, Rochester, N.Y.

[73] Assignee: Eastman Kodak Company, Rochester, N.Y.

[21] Appl. No.: 242,904

[22] Filed: May 16, 1994

[51] Int. Cl.$^6$ ................................................. G03B 29/00
[52] U.S. Cl. ............................................................. 354/62
[58] Field of Search ................................................ 354/62

[56] References Cited

U.S. PATENT DOCUMENTS

| | | | |
|---|---|---|---|
| D. 321,704 | 11/1991 | Leonard et al. | D16/200 |
| 2,357,328 | 9/1944 | Harris | 242/71 |
| 2,865,271 | 3/1956 | Klein | 354/62 |
| 4,882,600 | 11/1989 | Van de Moere | 354/64 |

FOREIGN PATENT DOCUMENTS 6-82894  3/1994  Japan ............... G03B 17/08

*Primary Examiner*—David M. Gray
*Attorney, Agent, or Firm*—Roger A. Fields

[57] ABSTRACT

An underwater single-use camera comprises a water-resistant casing, and a thumbwheel positioned outside the casing to be manually rotated in a film winding direction. The casing has a protective raised sealing lip disposed at a location which would cause the raised lip to obstruct one's finger when the finger is moved in contact with the thumbwheel to rotate the thumbwheel in the film winding direction, and it has a guide positioned adjacent the thumbwheel to direct the finger over the raised lip.

2 Claims, 5 Drawing Sheets

UNDERWATER SINGLE-USE CAMERA WITH GUIDE TO DIRECT ONE'S FINGER OVER OBSTRUCTION DURING ROTATION OF THUMBWHEEL

CROSS-REFERENCE TO RELATED APPLICATION

Reference is made to commonly assigned copending application Ser. No. 08/242,905, entitled UNDERWATER SINGLE-USE CAMERA WITH THUMBWHEEL HAVING UNDERCUT FOR EASY GRIP and filed May 16, 1994 in the names of Jerry L. Hargrave and Joyce M. Ervin, which is assigned to the assignee of this application.

FIELD OF THE INVENTION

The invention relates generally to the field of photography, and in particular to underwater single-use cameras.

BACKGROUND OF THE INVENTION simple cameras which are sold pre-loaded with 35 mm size film, commonly referred to as "single-use cameras", have become well known recently. Each single-use camera is a point-and shoot type, and it comprises a plastic light-tight camera housing with a film cartridge receiving chamber and an exterior decorative cardboard cover or casing which snugly contains the camera housing. At the manufacturer, the cartridge receiving chamber is loaded with a conventional 35 mm film cartridge containing a perforated filmstrip in roll form, and substantially the entire length of the unexposed filmstrip is factory prewound from the film cartridge into a film supply chamber of the camera housing. After the user takes a picture, a thumbwheel or knob is manually rotated to rewind the exposed frame into the film cartridge. The rewinding movement of the filmstrip the equivalent of one frame rotates a sprocket wheel with teeth for engaging the filmstrip in its respective perforations to, in turn, decrement an exposure counter to its next lower number setting and to lock the thumbwheel until another frame is exposed. When the entire length of the filmstrip is exposed and rewound into the film cartridge, the single-use camera is given to a photofinisher who tears the exterior casing off the camera housing, takes apart the camera housing, and removes the film cartridge from the cartridge receiving chamber. Then, the film cartridge is broken open and the exposed filmstrip is withdrawn for processing. The reusable parts of the single-use camera may be recycled for use in a fresh camera with film.

Prior art U.S. Pat. Nos. 4,882,600, issued Nov. 21, 1989, and No. Des. 321,704, issued Nov. 19, 1991, disclose a single-use camera enclosed in a plastic transparent water-resistant casing to enable the single-use camera to be used as an underwater camera. The thumbwheel or knob for rewinding the film frames into the film cartridge, following each exposure in the underwater camera, is positioned outside the water-resistant casing.

SUMMARY OF THE INVENTION

According to the invention an underwater single-use camera comprising a water-resistant casing, and a thumbwheel positioned outside the casing to be manually rotated in a film winding direction is characterized in that:

the casing has a protective raised sealing lip disposed at a location which would cause the raised lip to obstruct one's finger when the finger is moved in contact with the thumbwheel to rotate the thumbwheel in the film winding direction, and it has a guide positioned adjacent the thumbwheel to direct the finger over the raised lip.

The raised sealing lip provides a water seal which is improved as compared to the one disclosed in prior art U.S. Pat. Nos. 4,882,600 and Des. 321,704. This is because of the increased size of the opposite lip surfaces that are adhered together to obtain the water seal. The guide, preferably a ramp or incline, serves to prevent the raised sealing lip from interfering with manual rotation of the thumbwheel.

DETAILED DESCRIPTION OF THE INVENTION

The invention is disclosed as being embodied preferably in an underwater single-use camera. Because the features of such a camera are generally known as exemplified by the camera illustrated in prior art U.S. Pat. Nos. 4,882,600, issued Nov. 21, 1989, and No. Des. 321,704, issued Nov. 19, 1991, the description which follows is directed in particular only to those elements forming part of or cooperating directly with the disclosed embodiment. It is to be understood, however, that other elements may take various forms known to a person of ordinary skill in the art.

U.S Pat. Nos. 4,882,600 and Des. 321,704 are incorporated in this application.

Figure 1:
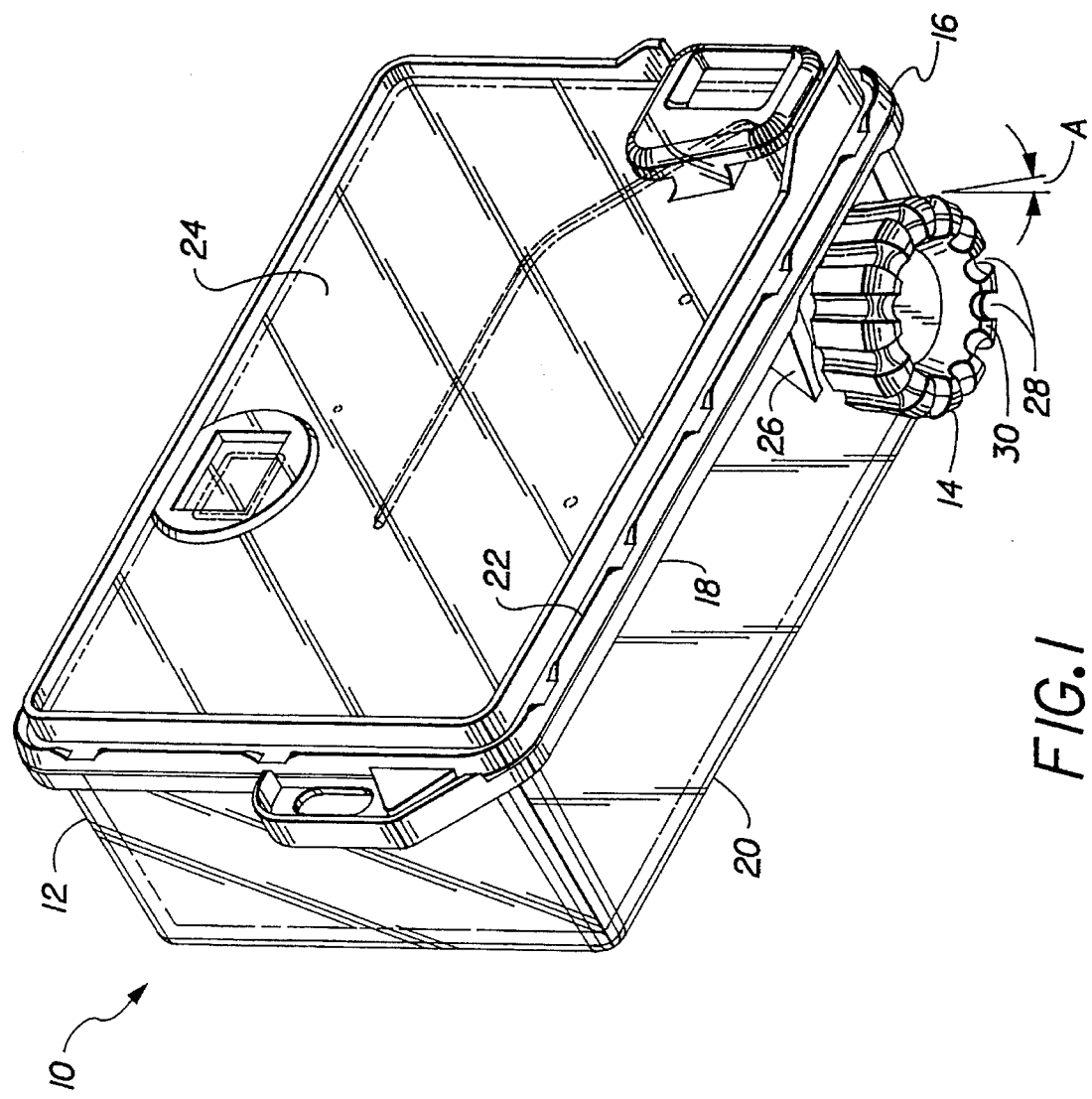
FIG. 1 is a bottom rear perspective view of an underwater single-use camera according to a preferred embodiment of the invention.
Figure 2:
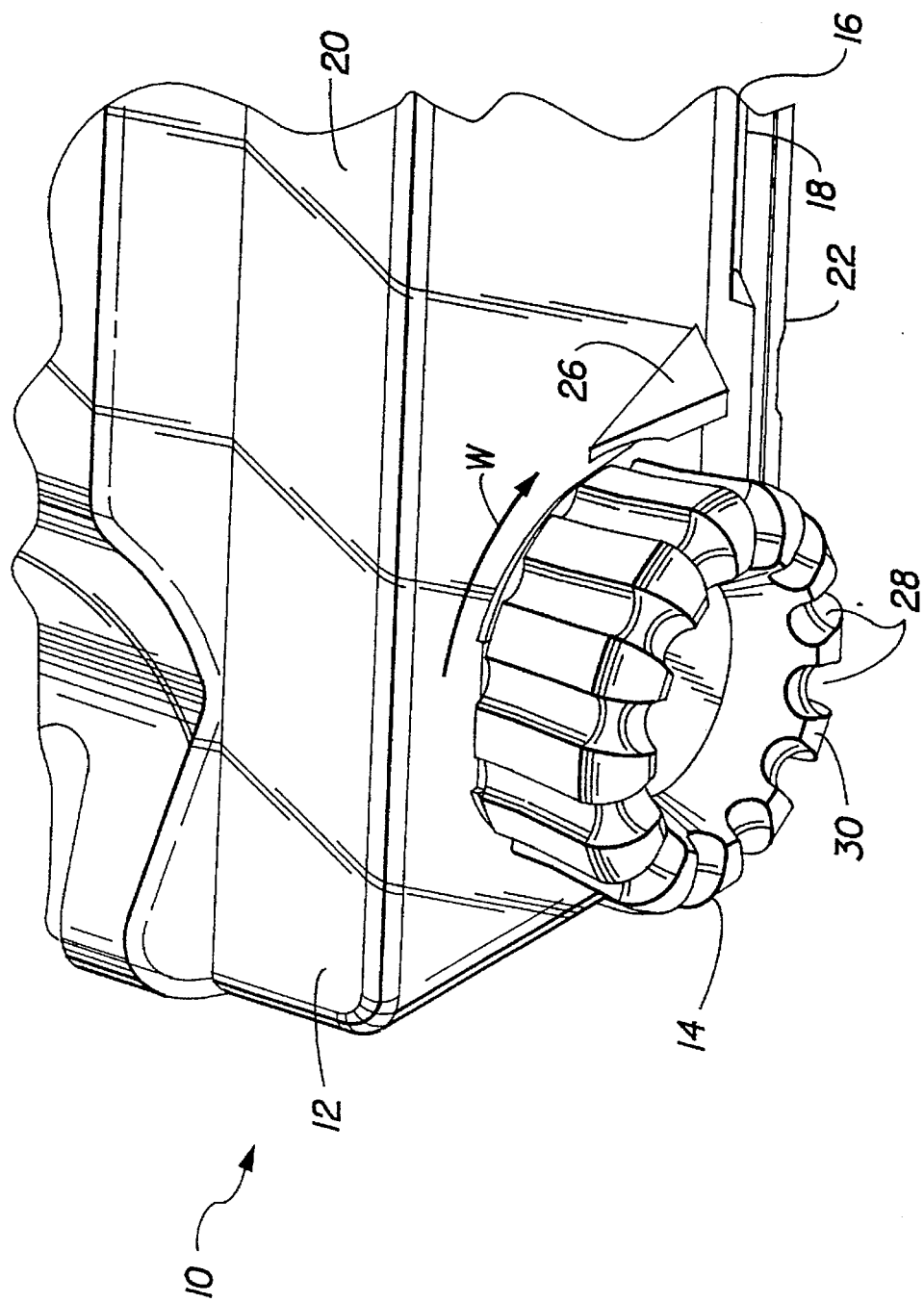
FIG. 2 is a a bottom rear perspective view of a particular portion of the camera.
Figure 3:
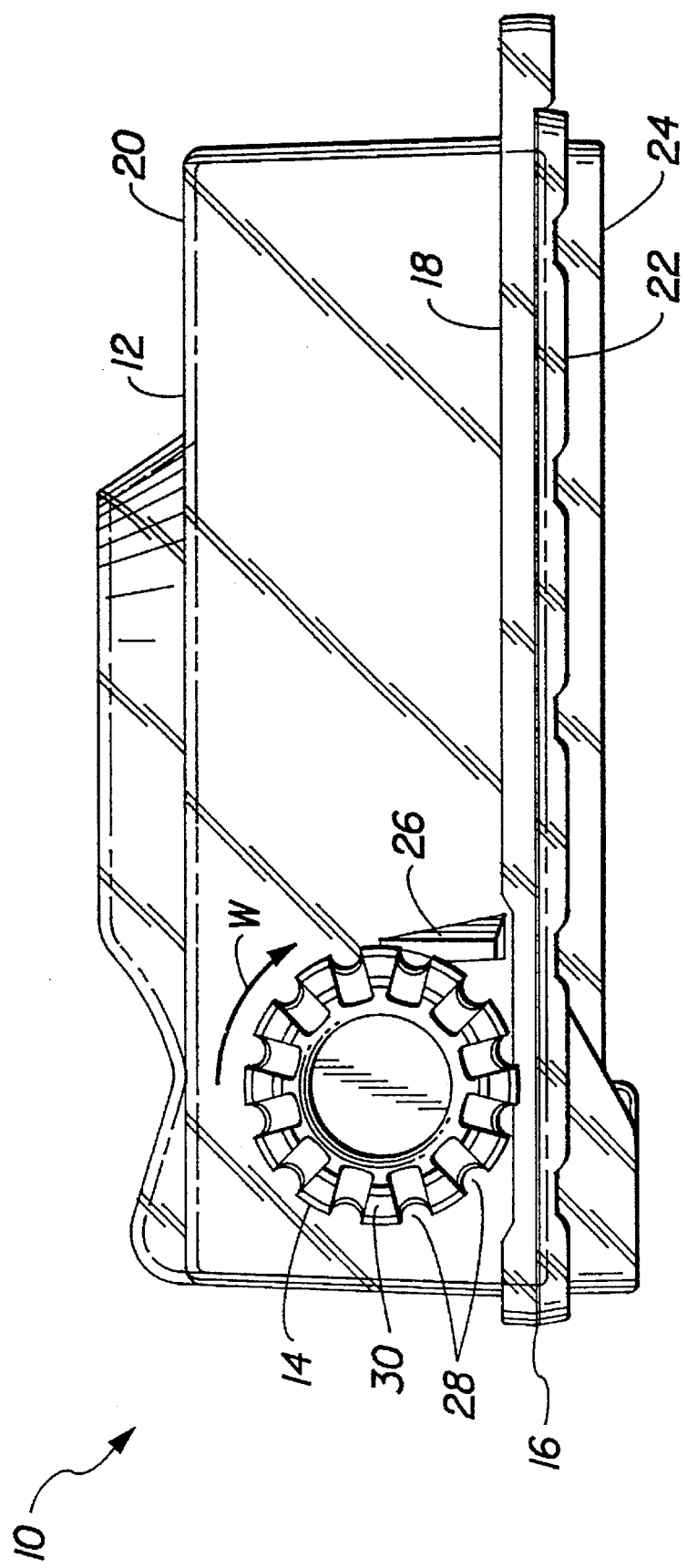
FIG. 3 is a bottom plan view of the camera.
Figure 4:
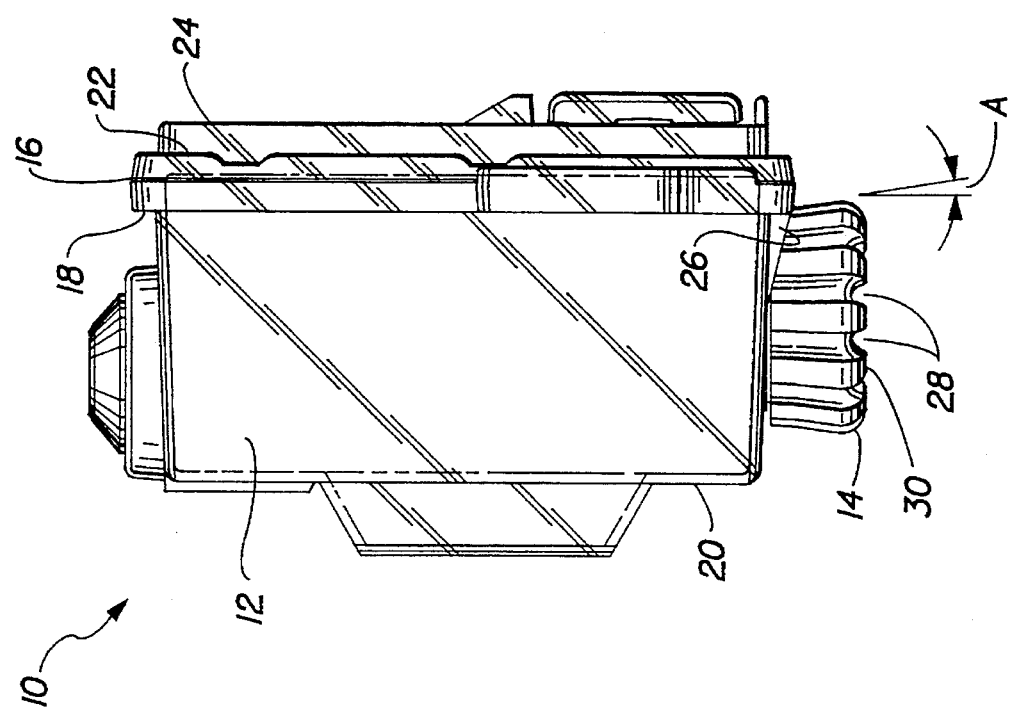
FIG. 4 is a side elevation view of the camera.
Figure 5:
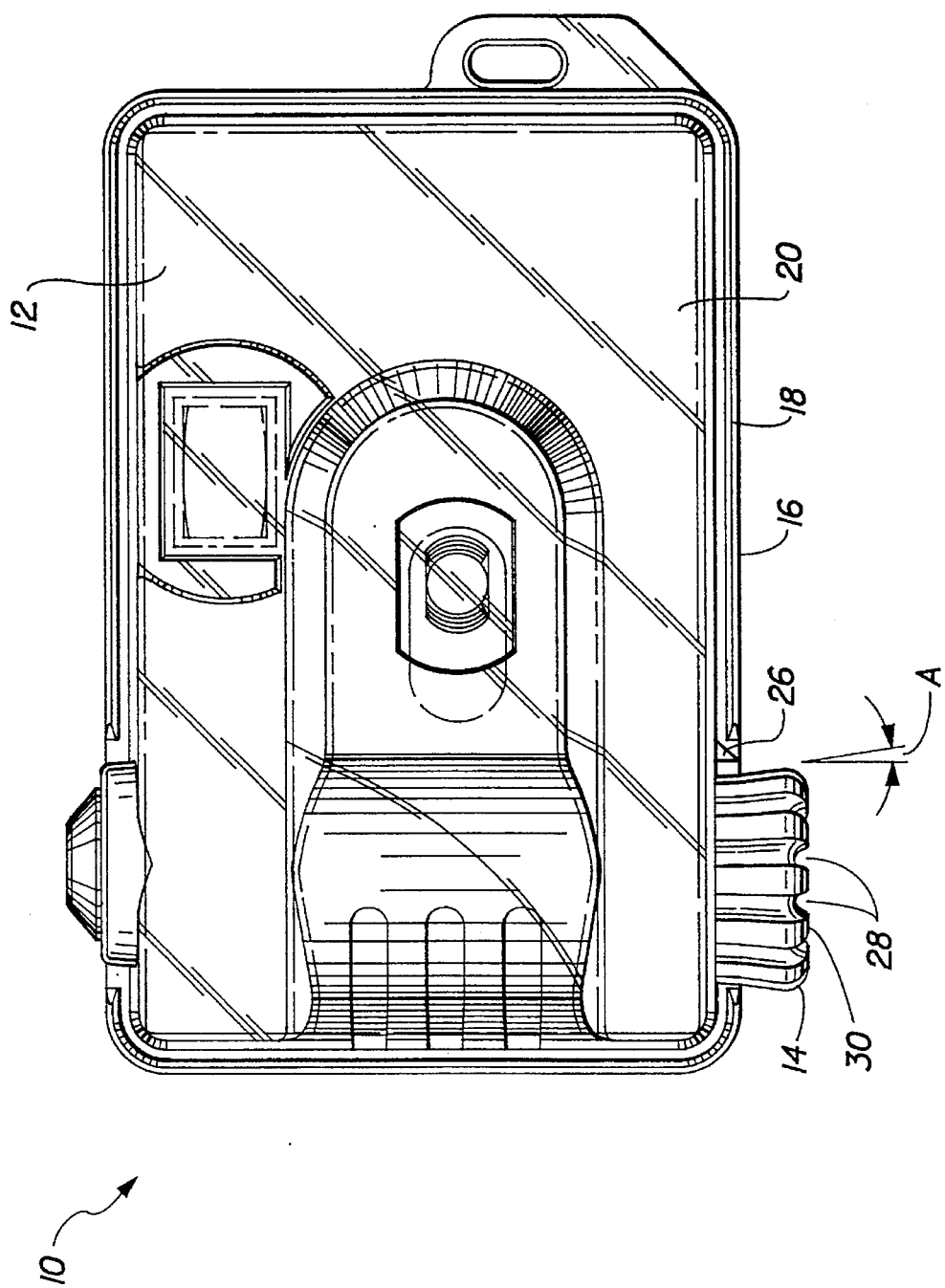
FIG. 5 is a front elevation view of the camera.

Referring now to the drawings, FIGS. 1–5, show an underwater single-use camera 1 similar in many respects to the underwater single-use camera illustrated in U.S Pat. Nos. 4,882,600 and Des. 321,704.

The underwater single-use camera 10 comprises a plastic transparent water-resistant casing 12, and a thumbwheel or knob 14 positioned outside the casing to be manually rotated in a film winding direction W. See FIGS. 1–3.

The water-resistant casing 12 has a protective raised sealing lip 16 that is defined by a raised circumferential (continuous) edge portion 18 of a main part 20 of the casing and a raised circumferential (continuous) edge portion 22 of a back part 24 of the casing. See FIGS. 1, 3 and 4. The two raised edge portions 18 and 22 are adhered together in a water-tight relationship along opposite, i.e. facing, lip surfaces. The adhering process can be accomplished using known vibration welding or other techniques. The raised sealing lip 16 provides a water seal which is improved as compared to the one disclosed in U.S. Patents Nos. 4,882,600 and Des. 321,704. This is because of the increased size of the opposite lip surfaces that are adhered together to obtain the water seal.

The raised sealing lip 16 is disposed at a location which would cause the raised lip to obstruct one's right-hand thumb when the thumb is moved in contact with the thumbwheel 14 to rotate the thumbwheel in the film winding direction W. To solve this problem, the water resistant casing 12 has an integral guide 26, preferably a ramp or incline, positioned adjacent the thumbwheel to direct one's right-hand thumb over the raised sealing lip 16 when the thumb is moved in contact with the thumbwheel 14 to rotate the thumbwheel in the film winding direction W. See FIGS. 1–5.

The thumbwheel 14 has a series of peripheral grooves 28 to facilitate its being manually grasped to rotate the thumbwheel in the film winding direction W. Moreover, the thumbwheel 14 is undercut obliquely from its top side 30, at the angle A shown in FIGS. 1 and 4, to make it easier to be manually grasped underwater, for example when wearing protective gloves. The undercut angle A is preferably 7.92 degrees; however, it can fall within the range of 5.92 degrees to 9.92 degrees. It has been found that this range is a good comprise that allows one to get a firm enough grip on the thumbwheel 14 to rotate the thumbwheel in the film winding direction W, and yet does not allow one normally to get too firm a grip on the thumbwheel which might result in damage to the film winding mechanism due to overwinding the thumbwheel.

The invention has been described with reference to a preferred embodiment. However, it will be appreciated that variations and modifications can be effected by a person of ordinary skill in the art without departing from the scope of the invention.

PARTS LIST

10. underwater single-use camera
12. water-resistant casing
14. thumbwheel or knob
W film winding direction
16. raised sealing lip
18. raised edge portion
20. main part
22. raised edge portion
24. back part
26. guide
28. peripheral grooves
30. top side
A undercut angle

I claim:

1. An underwater single-use camera comprising a water-resistant casing, and a thumbwheel positioned outside said casing to be manually rotated in a film winding direction is characterized in that:

said casing has a raised sealing lip disposed at a location which would cause said raised lip to obstruct one's finger when the finger is moved in contact with said thumbwheel to rotate the thumbwheel in the film winding direction, and it has a guide positioned adjacent said thumbwheel to direct the finger over said raised lip.

2. An underwater single-use camera as recited in claim 1, wherein said guide is a ramp integral with said casing.

\* \* \* \* \*